United States Patent

[11] 3,597,853

[72] Inventor George F. Kucera
      Palo Alto, Calif.
[21] Appl. No. 834,854
[22] Filed June 19, 1969
[45] Patented Aug. 10, 1971
[73] Assignee Ira G. Corn, Jr.
      Dallas, Tex.

[54] CONTRACT BRIDGE SIMULATOR
     13 Claims, 12 Drawing Figs.
[52] U.S. Cl. .................................................. 35/8 B, 35/76
[51] Int. Cl. .................................................. G09b 19/22
[50] Field of Search ........................................ 35/8 B, 9, 9 B, 76; 273/148 R

[56] References Cited
     UNITED STATES PATENTS
     2,204,199  6/1940  Willis ........................... 35/8 B

*Primary Examiner*—Wm. H. Grieb
*Attorney*—Townsend and Townsend

ABSTRACT: An elongate indicia bearing strip having preprogrammed indicia thereon for guiding the user through the bidding and playing procedures of a bridge hand. A mechanism for supporting the strip so that the strip can be positioned and advanced as bidding and playing proceed. The mechanism includes interchangeable opaque plates having openings therein that are positioned so as to reveal to the user indicia corresponding to the bidding and playing steps in proper sequence. A rotatable disc that has openings therein proportioned to reveal bids and plays in proper sequence. An auxiliary elongate scroll sheet that contains explanatory and educational material thereon which is descriptive of the bids and plays appearing on the first-mentioned strip together with a support mechanism for advancing the scroll in proper correlation with the strip advance.

Patented Aug. 10, 1971
3,597,853
4 Sheets-Sheet 1
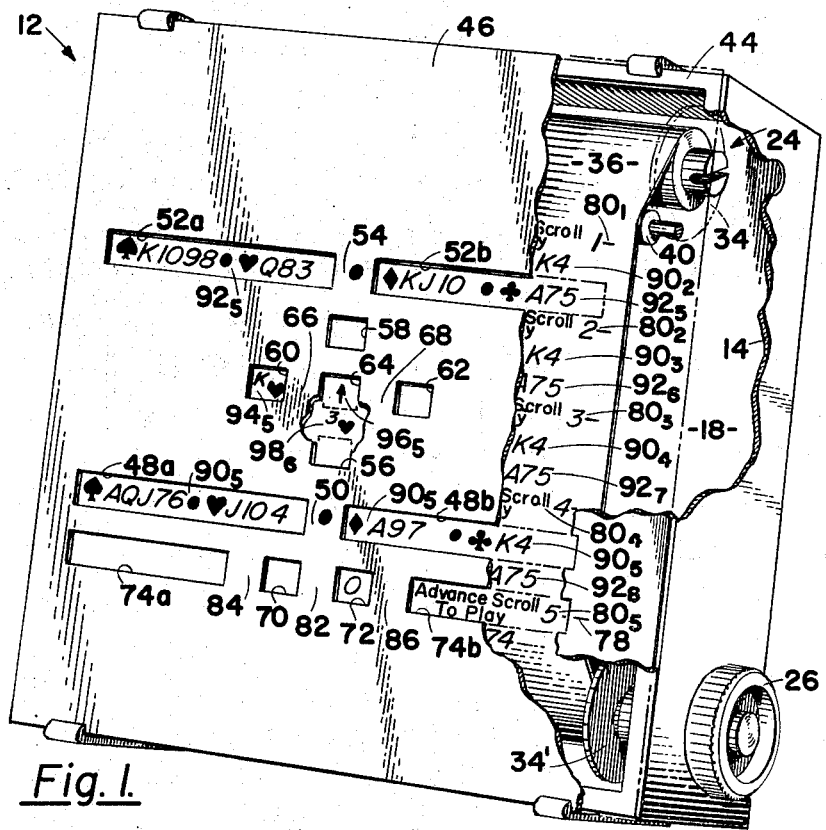
Fig. 1.
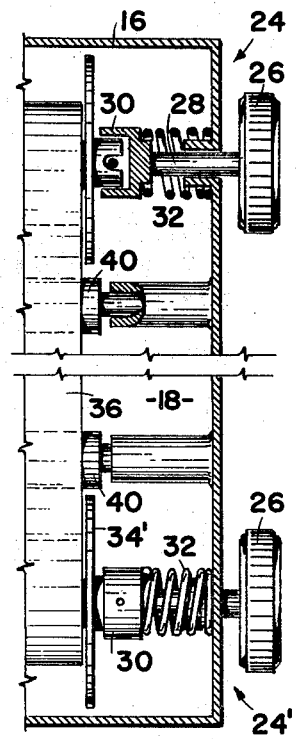
Fig. 1a.
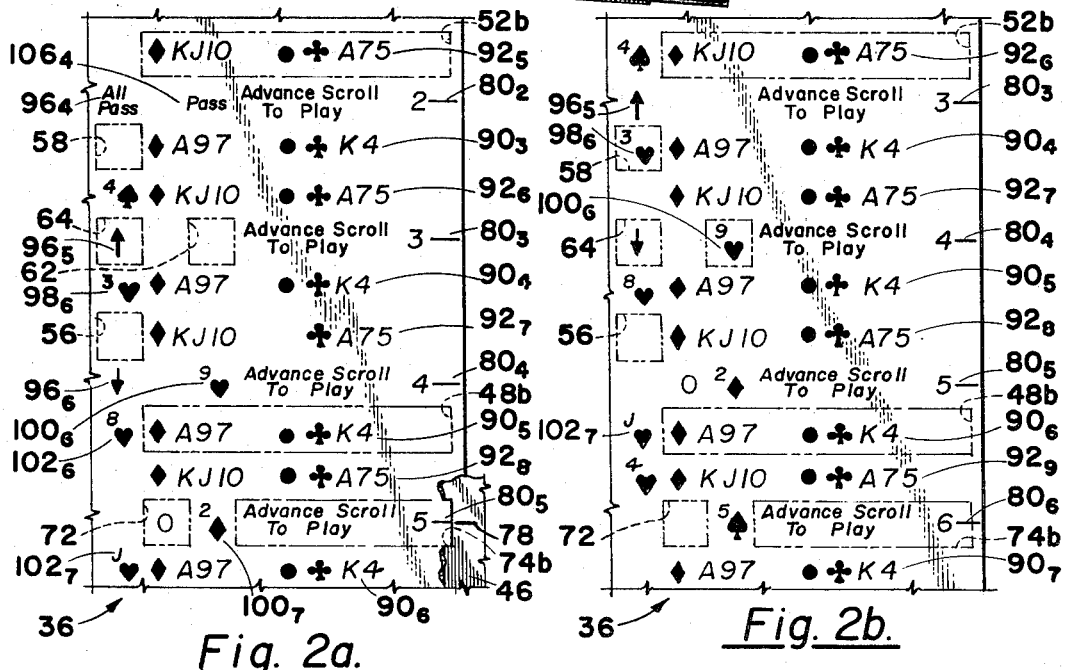
Fig. 2a.
Fig. 2b.
GEORGE F. KUCERA
INVENTOR.
BY
Townsend and Townsend

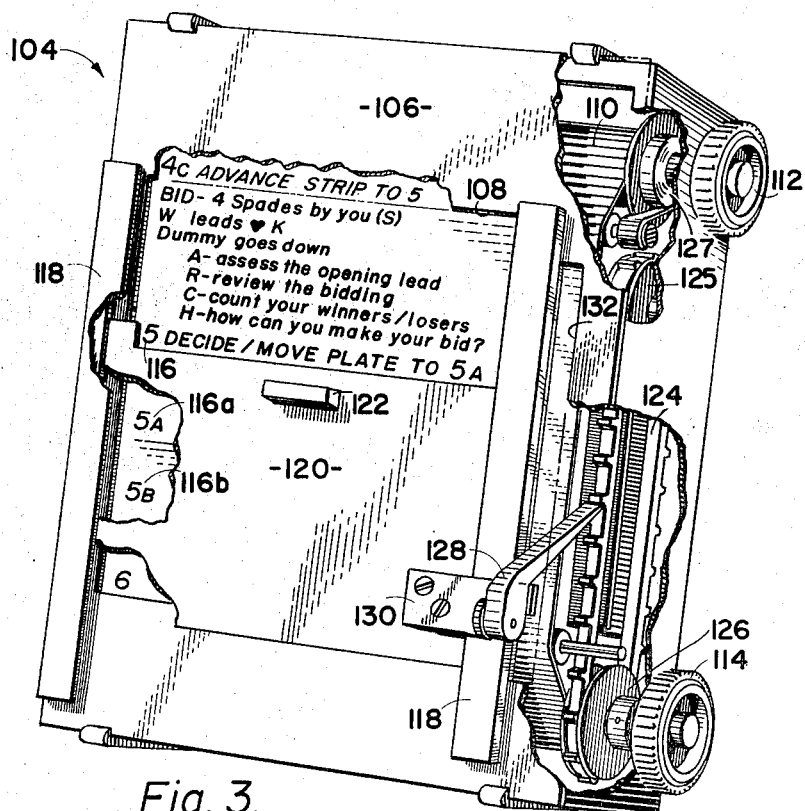
Fig. 3.
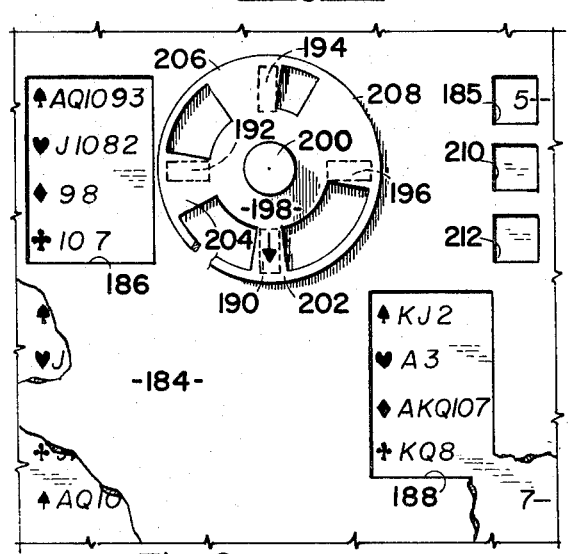
Fig. 6a.  Fig. 6b.
Fig. 6c.
GEORGE F. KUCERA
INVENTOR.
BY
Townsend and Townsend Patented Aug. 10, 1971

GEORGE F. KUCERA
INVENTOR.

BY

Townsend and Townsend

Patented Aug. 10, 1971

GEORGE F. KUCERA
INVENTOR.

BY

Townsend and Townsend 3,597,853

CONTRACT BRIDGE SIMULATOR

This invention relates to a device for simulating the game of contract bridge, and is particularly suited for enabling one or more persons to learn, practice, and play such card game.

Included in the pertinent prior art are devices that are intended to permit an individual to learn and practice bidding and playing of the game of contract bridge. Such devices suffer from one or more of the following disadvantages: the devices provide for only a single player; that player is always the declarer; the fact that the player must become the declarer influences the bidding; there is no provision for the player to be a defender rather than declarer; bids persist visually from one bid to the next and several bids may be visible at any time; cards played are not exposed sequentially with the player, or players, in control of when the next card is ready to be exposed; information is given the player prematurely, thus influencing his play; partnership bidding is not possible; partnership defense is not possible; bids or plays are presented that the player does not understand or comprehend and the bidding or play proceeds to the next bid or play with the player having no idea of what is going on; information is presented after the hand has been completed with respect to bids that took place and plays that took place, whereas the player should have been presented an explanation at the time the bid or play took place in order that he can intelligently follow the procedures being utilized; indicia must be removed and other indicia inserted from one hand to another; the devices require many small moving slides or like fragile parts which are at best difficult to manipulate and at worst subject to frequent breakage; they require auxiliary material, such as paper and pencil to record the indicia manually for each hand to be played; the devices do not resemble the regular bridge format and it is difficult to associate with the regular bridge format; the devices are either so large as to be cumbersome or so small that the printed indicia designating bids, card positions, or card plays are of insufficient size for desirable legibility.

The principal object of the present invention is to overcome the above enumerated shortcomings. According to the present invention, an elongate sheet or roll of paper or like material has printed thereon indicia that indicate a bidding and playing sequence of one or more contract bridge hands. Apparatus is provided for intermittently advancing the sheet beneath an opaque planar member that has openings so positioned with respect to the arrangement of the indicia on the sheet to reveal to the user his hand, the recommended bids and plays for such hand, and the bids and plays of the other players. The indicia on the sheet are so located that the sequence of bids and plays presented accurately follows the order of actual bridge bidding and playing.

A more specific object of the present invention is to provide a device with the advantageous characteristics alluded to above that is extremely small, lightweight and portable; and has the inherent characteristics that allow for the device to be tabletop size or larger if desired.

Achievement of this object is made possible because the indicia bearing sheet is arranged to be rolled on to a supply reel and then fed beneath the opaque planar member to a takeup reel. Because the maximum number of cards that need ever to be displayed at any one time is about half the cards in the deck, the planar member and the openings therein that serve to reveal the card indicia can be of small size without sacrificing legibility.

Still another object is to provide apparatus that affords a verbal description of the proper bids and plays together with reasons therefor which is correlated with the bids and plays displayed, as described above. This object is achieved by providing a scroll strip separate from the previously mentioned indicia bearing sheet on which is printed verbal information of the character desired. The correlation between movement of the scroll strip and the indicia bearing sheet is achieved by providing corresponding markings on the two, or by electrically or mechanically linking the transport mechanisms associated with the two to one another. Of course, the verbal information can be presented in more foreshortened form by printing such verbal description, information and teaching information on an extension in width of the primary indicia bearing sheet and would be viewed through an appropriate opening, the mechanism of which would be controlled by the player.

Yet another object is to provide a device of the type referred to above in which the player does not know at the outset whether he will play the hand as a declarer or as a defender. This should be contrasted with other known devices wherein one hand, typically the south hand, is always the declarer, the north hand is always the dummy, and east and west always defend. This object is achieved according to the present invention by providing several interchangeable opaque planar members or plates in which the openings are arranged in a different pattern. One planar member is adapted to display the bidding stages and to permit play when either north or south is the declarer. Should it appear after the bidding that east, for example, will be the declarer, however, a specially adapted planar member can be substituted for the planar member that was in place during the bidding sequence. Such mode of operation is possible because the indicia on the sheet can be arranged in a preprogrammed manner to cooperate with any appropriate opaque planar member.

A feature and advantage of the present invention is that because the indicia bearing sheets can be readily inserted into and removed from the apparatus and one of several planar members can be used in conjunction with the apparatus, a wide variety of hands, playing techniques, bidding systems, and conventions can be made available to and taught to the user of the device. For instance, different levels of players can learn aspects of the game appropriate to the particular skill level of the player, and those desiring to become proficient at duplicate bridge require somewhat different principles and strategies than those desiring to learn rubber bridge. By appropriate programming or arrangement of the indicia on the indicia bearing sheets the foregoing desiderata can be achieved by the present invention.

Another feature and advantage resides in an alternate embodiment of the present invention. A planar member is provided that has mounted thereon a disc that has one or more strategically located openings therein. In registry with the disc are openings in the planar member which are concealed or revealed in accordance with the rotational position of the disc. This enables the bidding or playing to be revealed sequentially in a rotative or clockwise fashion as is the case in the actual bidding and playing of the game. This alternate embodiment of the invention also conserves space on the indicia bearing sheet since playing and bidding sequences are advanced by a combination of sheet advancement and disc rotation rather than sheet advancement alone as in the form of the invention heretofore described.

One form of the disc referred to above has one set of circumferentially spaced apart openings, which openings can be arranged to reveal either the bids of the player or the plays of the players. Another form of the disc has two radially spaced sets of openings, one set being arranged to reveal bidding and the other set being arranged to reveal plays. In each case the discs afford a format that accurately duplicates the tempo and format of an actual bridge game.

The foregoing together with other objects, features and advantages will be more apparent after referring to the following specification and accompanying drawings in which:

FIG. 1 is a perspective view of one form of the present invention with portions broken away to reveal internal details;

FIG. 1a is a plan view in cross section of a portion of FIG. 1 and drawn to a larger scale;

FIGS. 2a and 2b are drawings of a fragment of an indicia bearing sheet for use in the device of FIG. 1;

FIG. 3 is a perspective view of a housing for supporting a scroll strip that bears explanatory material relating to the device of FIG. 1;

FIGS. 6a and 6b are views of an alternate embodiment of the invention suitable for use in simulating defensive play;

FIG. 6c is a detailed view at enlarged scale taken along line 6c—6c of FIG. 6b.

Figure 4:
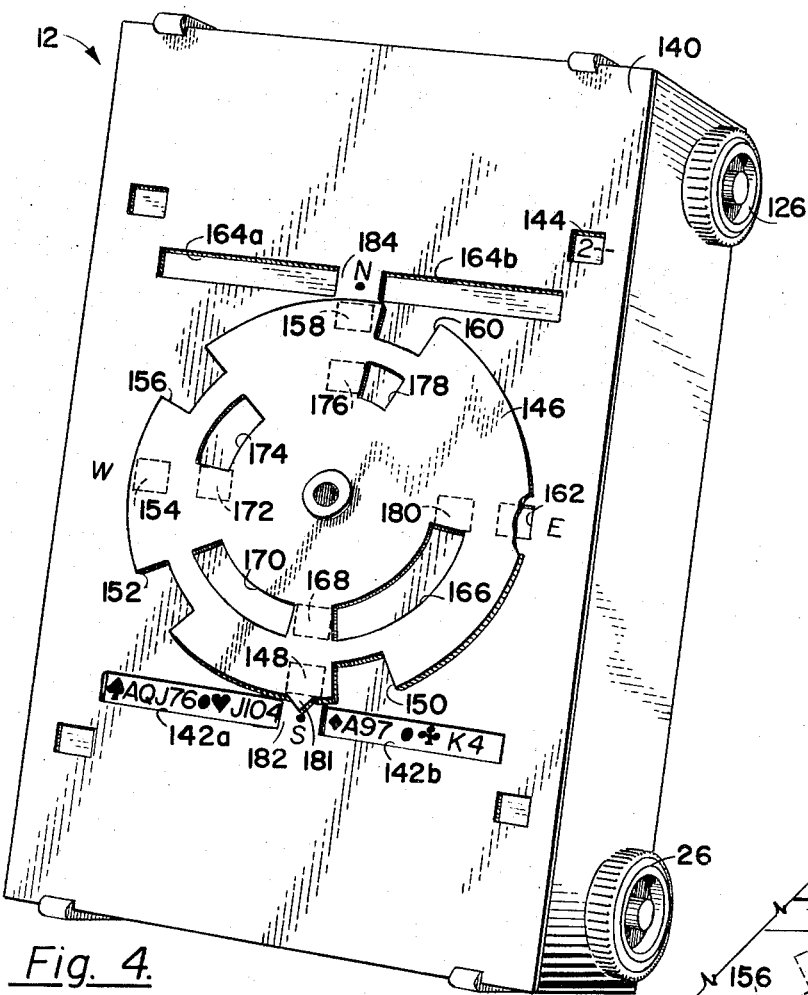
FIG. 4 is a perspective view of an alternate embodiment of the invention.

Referring more particularly to the drawings reference numeral 12 indicates a housing formed by sidewalls 14, endwalls 16, and a bottom wall 18. The housing has an open top adapted to receive a cover plate which is described hereinbelow. Sidewalls 14 have associated therewith adjacent each ends thereof a spool-supporting mechanism indicated respectively at 24 and 24'. The mechanisms are substantially identical. Mechanism 24 includes a knurled knob 26 that is carried on a shaft 28 on the inner end of which is provided a socket 30. A compression spring 32 is provided for biasing socket 30 inwardly so as to engage and to support a flanged spool 34 asbetween the socket and a suitable post mounted opposite the socket. In order to remove spool 34 from the apparatus, one need only withdraw knob 26 outwardly against the force of spring 32 until socket 30 disengages with a complementary member provided on the spool. At the opposite end of housing 12 a similar spool winding mechanism 24' is provided and need not be explained since it is identical to that described above. Suffice it to say the mechanism 24' supports a supply reel 34'. Extending from supply reel 34' to takeup reel 34 is an indicia bearing sheet 36, the specific contents of which will be described in more detail hereinafter. Sheet 36 is constrained for movement in a path parallel to and closely adjacent to the open top of the housing, and for so constraining the sheet, there are supported between sidewalls 14 a pair of guide rollers 40.

Mechanisms 24 and 24' are merely exemplary of suitable means for advancing sheet 36 by a prescribed increment. Other devices for the same purpose that will occur to the skilled artisan include ratchet and pawl mechanisms, cam operated mechanisms, sprocket drive mechanisms, electromechanical transport systems, and the like. Such devices can readily be provided to achieve precise sheet advancement or gross advance supplemented by a fine adjustment to provide proper positioning of the sheet.

The open top of housing 12 is rimmed by a lip 44 for supporting a planar opaque plate 46 across the open top.

The plate defines a plurality of openings to reveal to the user of the apparatus selected indicia contained on roll 36. By appropriate manipulation of roll advance mechanisms 24 and 24', selected indicia can be moved into registry with the openings for viewing by the user of the device.

Plate 46 includes transversely aligned openings 48a and 48b that are adjacent the end wall 16 that is closest to the user of the device. Openings 48a and 48b are provided for revealing to the user of the device of the cards in his hand, the south hand, Openings 48a and 48b are spaced from one another so that an opaque region 50 exists therebetween; as will appear subsequently, opaque region 50 masks from view indicia designating the bids made and the cards played by the south and north hands, thereby to conserve space on sheet 36. The opaque regions can be eliminated at the expense of moving roll 36 an additional space each time it is advanced in order to avoid appearance of a given indicium in two openings. Openings 52a and 52b are formed at the opposite end of plate 46 for revealing the north or dummy hand at the appropriate time. Openings 52a and 52b are separated by an opaque region 54. Opaque regions 50 and 54 are in longitudinal alignment with one another; also in longitudinal alignment with such opaque portions are a south opening 56 and a north opening 58 which are provided to reveal to the user of the device the bids and/or plays by the north and south hands. In quadrature with the openings 56 and 58 are a west opening 60 and an east opening 62 that display the bids and plays of the respective hands. In the center of the four bid/play openings is an opening 64 that is provided for revealing an arrow directed toward the specific opening 56, 58, 60 or 62, in which the next sequential bid and/or play will be displayed. As can be seen in FIG. 1, an opaque region 66 exists between opening 60 and 64 and an opaque region 68 exists between opening 62 and 64. In longitudinal alignment with such opaque regions are openings 70 and 72, respectively. Openings 70 and 72 are provided for displaying a cumulative trick count for the east and west team and for the north and south team. Laterally spaced from openings 70 and 72 are openings 74a and 74b which display appropriate information to the players such as symbols for correlating the position of roll 36 to an explanatory scroll strip to be described subsequently. Openings equivalent to openings 74a and 74b can be located elsewhere on the plate so long as they are positioned to avoid revealing improper or unwanted information. Adjacent opening 74b is an index mark 78; roll 36 has corresponding marker indicium $80_5$ thereon that is adapted for registry with index mark 78 to position roll 36 properly with respect to the openings in plate 46. Associated with each marker indicium 80 on roll 36 is a cardinal number for identifying to the user the position of the roll 36. Also revealed in opening 74b is a verbal reference to a scroll strip, i.e., an information bearing elongate sheet describing the plays and explained in more detail hereinafter. Between openings 70 and 72 is an opaque region 82 that is in longitudinal alignment with openings 56, 58 and 64. Between openings 70 and 74a is an opaque region 84 that is in longitudinal alignment with opening 60 and between openings 72 and 74b is an opaque region 86 that is in longitudinal alignment with opening 62. The lateral offset relationship of openings 60, 64 and 62 with respect to openings 70 and 72 conserves space on roll 36 in that indicia appearing, for example, in opening 70 will not appear in openings 60, 64 or 62 but will be obscured by opaque portion 66. Cooperating with the relative spacing of the openings in plate 46 for preventing unwanted appearances of an indicium in more than one opening is the fact that roll 36 is moved a prescribed number of spaces each time it is advanced.

The arrangement of the indicia on the particular roll 36 shown in FIGS. 1—2 is such that the roll is advanced three lines for each change in bidding or playing. The openings in plate 46 are longitudinally spaced from one another at a distance other than three spaces so that information is not displayed through an incorrect or undesired opening in the planar member. Such arrangement shown in FIG. 1 is but a special case for the general relationship that the indicia bearing sheet is advanced $kn$ units for each sequential bid or play, and longitudinally aligned openings in plate 46 are spaced from one another by a distance $k(m(n\pm 1))$, wherein $k$ is the longitudinal dimension of the openings in plate 46, and $m$ and $n$ are positive integers.

The relative position of the openings in opaque member 46 are such that the space on roll 36 can be exploited to the fullest; more specifically with respect to FIG. 1, it can be seen that the longitudinal dimension of each of the openings and the spaces between the openings be considered as $k$ units, then the distance from opening 48 to opening 52 is $8k$. Since it is essential that the indicia appearing in opening 48 never appear in opening 52, it is desirable to provide means for advancing sheet 36 by an amount equal to $3k$. It will be appreciated that in this instance, $n$ is 3 and $m$ is 2. There is a similar relationship between all other longitudinal openings and the amount of advancement of sheet 36 to move marker indicia 80 sequentially into alignment with index marker 78 on plate 46.

In order to describe the full operation of the invention, it is necessary to explain the arrangement of the indicia on roll 36. To this end, roll 36 will be considered as bearing plural sets of indicia, each set being associated with a specific cardinal number associated with a corresponding marker indicium 80. In the following description, the specific set of which a particular indicium is a member will be identified by a subscript appended to the reference numeral designating the indicium, which subscript is the same cardinal number as that adjacent marker indicium 80. Thus a transversely extending row of indicia $90_5$ is visible through openings 48a and 48b, and reveal to the player the holdings in the south hand when marker indicium $80_5$, associated with the cardinal number 5, is in registry with index mark 78 on plate 46 adjacent opening 74b. Another transverse row of indicia $92_5$ is visible through openings 52a and 52b to reveal the holdings of the north hand. With roll 36 in the position of FIG. 1 an indicium $94_5$ is visible through opening 60 and reveals that the west hand has led the king-of-hearts. An indicium $96_5$ in the form of an arrow, which is visible through opening 64, indicates to the player that the next play is to come from the north or dummy hand. At this stage of use of the apparatus, the player decides which card he will play from the dummy. In the hand exemplified in FIG. 1, the three-of-hearts is the recommended play, and the corresponding indicium is indicated at $98_6$, the subscript indicating that it is necessary to move marker indicium $80_6$ to a position in registry with index marker 78 before indicium $98_6$ is visible to the player through opening 58. In addition, an indicium $100_6$ appears in opening 62, (see FIG. 2b). Indicium $100_6$ appears simultaneously with indicium $98_6$ because the declarer has no control over east's play. The user of the device now studies his hand as revealed by indicia $90_5$ through opening 48a and 48b and makes a decision as to his play. In the hand illustrated in FIGS. 1, 2a, and 2b, the recommended play is the jack-of-hearts. Such play is indicated by indicium $102_7$, (see FIG. 2b) which appears when sheet 36 is advanced to bring cardinal number 7 into view through opening 74b. Such play is a false carding maneuver and is explained on the explanatory scroll which will be described below. When roll 36 is advanced at the end of a trick, the cards that have been played are absent when the holdings of the south and north hands are next displayed in openings 48a, 48b, 52a, and 52b.

Referring to FIG. 3, the scroll strip containing explanatory material is housed in a housing 104 constructed in the manner similar to housing 12 previously described. Housing 104 includes a top panel 106 that defines a rectangular opening 108. An elongate scroll strip 110 is supported for movement beneath panel 106 and past opening 108, strip-moving mechanisms 112 and 114 being provided for this purpose. Strip-moving mechanisms 112 and 114 are substantially identical to mechanisms 24 and 24' described previously in connection with FIG. 1 and therefore will not be described in further detail at this point. It will be noted that scroll strip 110 includes a cardinal number 116 that corresponds to the cardinal number 5, identifying index mark $80_5$ on indicia bearing sheet 36. Such cardinal numbers serve to correlate the information contained on scroll strip 110 with the information contained on sheet 36.

Housing 104 can be physically separate from housing 12 or it can be permanently or removably joined to housing 12 so as to afford the use of a side-by-side presentation of the bids and plays and the verbal material explaining such bids and plays.

The lateral edges of rectangular opening 108 are each provided with an inwardly extending lip 118 that slidably supports an opaque cover plate 120 for movement longitudinally on opening 108. The opaque plate has a handle 122 thereon for affording a finger grip to the user of the device. Cover plate 120 is slidable from the position shown in FIG. 3 so that the information contained on the portion of scroll strip 110 in alignment with opening 108 can be disclosed sequentially to the user of the device. Scroll strip 110 can preferably be provided with symbols for indicating the amount of travel of cover plate 120 that is necessary to present a complete instruction or comment. Shown in FIG. 3 are additional indicia 116a, 116b, etc. After the user assimilates the material revealed as in FIG. 3, he moves slide 120 downward until indicia 116a, ("5A") is revealed. The user studies the verbal material associated with that indicia and then moves slide 120 until indicia 116b ("5B") is revealed. This continues until he is instructed by the verbal material on scroll strip 110 to advance indicia bearing sheet 36 in housing 12 shown in FIG. 1. After cover plate 120 has been moved downwardly to the full extent possible, it is desirable that on its return movement, scroll strip 110 be advanced. For accomplishing this purpose, one structure that can be utilized includes a serrated chain or belt 124 which extends between an idler sheave 125 and strip advancing mechanism 114, a sheave 126 exemplifying a suitable expedient for operatively connecting belt 124 to the strip advance mechanism. A flat coil spring 127 forms a part of roll advance mechanism 112 so that when the resistance afforded by roll advance mechanism 114 is relieved by advancement of belt 124, strip 110 is caused to be taken up by the upper spool as viewed in FIG. 3 by the force of spring 127. Engaging the serrations on belt 124 is a pawl 128 that pivotally depends from a lateral extension 130 that is rigid with cover plate 120. Top wall 106 is formed with an elongate slot 132 that is located parallel with belt 124 so that pawl 128 can cooperate with the belt. It will thus be seen, when the cover plate 120 is moved in an upward direction as viewed in Fig. 3, that pawl 128 engages one of the serrations or protuberances on belt 124 and advances the belt in the same direction. This permits advance of strip 110 by a corresponding amount. Obviously, a small amount of manual adjustment on strip advance mechanisms 112 and 114 may be desired in effecting the precise positioning of the scroll strip with respect to opening 108. It will thus be seen that the player is apprised at all times of what bids are to be made or what cards are to be played and the reasons for such plays. Also each of two (or more) players can be apprised because each can be provided with a scroll and scroll housing.

Scroll strip 110 exemplifies any suitable means for supplying verbal information that apprises the user of the correct bids and plays and the reasons therefor. Equivalents of scroll strip 110 include audio tapes or discs and like media for communicating verbal information.

Figure 5B:
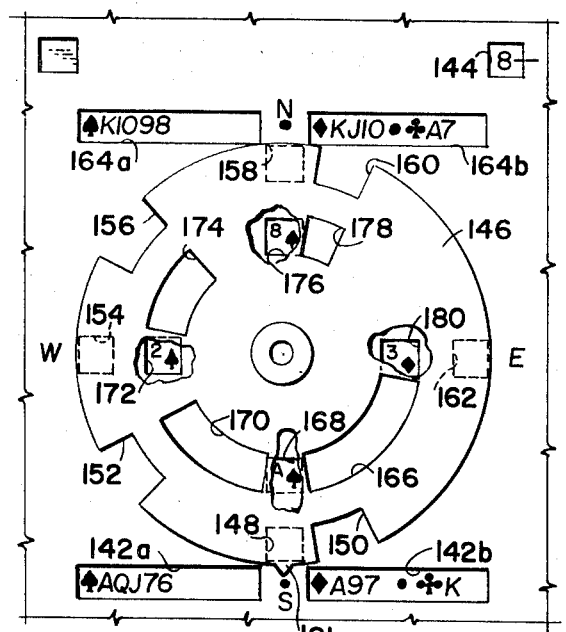
FIG. 5a and 5b are top views of the embodiment of FIG. 4 and illustrating a sequence of play.
Figure 5A:
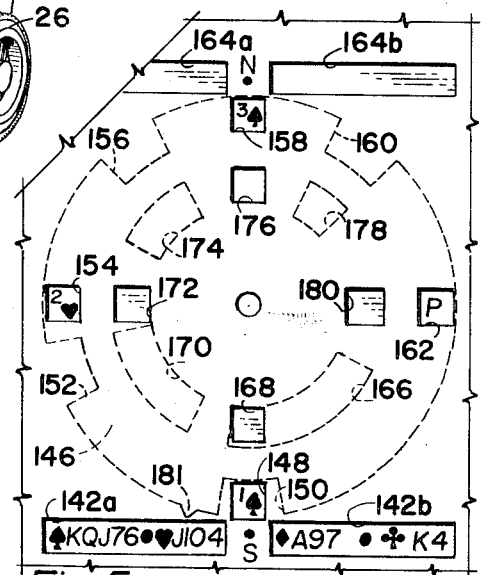

Referring to FIG. 4, an opaque planar plate 140 shown in place on the housing. Plate 140 defines transversely aligned openings 142a and 142b through which is revealed to the user of the apparatus the card holdings of the south hand. The holdings as indicated in FIG. 4 are displayed in a second set of indicia for a given hand, a cardinal numeral 2 appearing through an opening 144, which apprises the user of the device that it is the second set of indicia. In this particular case, the player who has the first bid is identified by arrow 181 on a rotatable disc 146. Such player has been instructed to formulate a proper bid and when he has formulated such bid he is told to rotate disc 146 in a clockwise direction from the starting point until an indicia is displayed through an opening 148 in plate 140 and a peripherally outward positioned opening 150 in the disc (see FIG. 5a). The recommended bid for the card holdings revealed through openings 142a and 142b is one spade. Thereafter, disc 146 is rotated until a peripheral opening 152 in the disc is brought into alignment with an opening 154 in plate 140. Such indicia, 2 hearts, indicates that the west hand has made such bid. It will be noted that the circumferential spacing between peripheral opening 150 and peripheral opening 152 is such that opening 148 is covered before opening 154 is revealed. This accords with the normal bidding procedure wherein each player is required to remember the preceding bids without a visible record of such preceding bids. The responsive bid of the north hand is next revealed by rotating disc 146 so that a peripheral opening 156 is brought into registry with an opening 158 in plate 140. Such bid is three spades, and as can be seen, both openings 148 and 154 are obscured before opening 158 is revealed to the player. Subsequently, the disc is further rotated so that a peripheral opening 160 is brought into registry with opening 162 in plate 140. Such bid is specified as "P" which indicates that the east hand passes. Disc 146 is then returned to the position at which arrow 181 points to the south hand, since south has the next bid. Thereafter, the sheet on which the indicia are printed is advanced until the next cardinal number 3 is brought into view through opening 144. Thereafter, the disc 146 is rotated revealing each bid in sequence until a contract is established.

Should north or south get the bid, the play proceeds by appropriate rotation of disc 146 utilizing an inner row of openings, the play openings. It will be assumed that the indicia bearing sheet has been advanced so that a hand corresponding to the north hand appears in transversely aligned openings 164a and 164b in plate 140. (See FIG. 5b). It will further be assumed that the south hand is the declarer and that play has progressed to a point at which it is south's lead. With disc 146 in the position shown in FIG. b, south decides what card should be lead, and then rotates disc 146 so as to bring an arcuate opening 166 in disc 146 into registry with opening 168 in plate 140.

In such opening is revealed the proper lead for south to make. Such lead is fully explained on a scroll strip of the type described hereinabove in reference to FIG. 3. In order to determine west's play, disc 146 is rotated further to reveal west's play through an arcuate opening 170 in disc 146 and an opening 172 in plate 140. It will be noted that the arcuate extent of opening 166 is sufficiently large that the indicium appearing through opening 168 remains visible. This accords with actual bridge play since a card played is visible to all players until the trick is completed and picked up. North's play is revealed by further rotation of disc 146 until an arcuate opening 174 in disc 146 is in registry with an opening 176 in plate 140. The circumferential extent of openings 166, 170 and 174 are such that when opening 178 is brought into registry with opening 180, all four cards are revealed and the player apprised of the plays that have been made. The winner of the trick has the lead and disc 146 is rotated so that an arrow 181 is positioned toward the player who next has the lead. Thereafter, the indicia bearing roll is advanced to bring the next cardinal number into view through opening 144. Thereafter rotation of disc 146 proceeds to indicate the cards played and each time south has a decision to make he is instructed by a scroll strip of the type depicted in FIG. 3.

An opaque space exists between opening 142A and 142B, such space being indicated by 182. A corresponding space 184 exists between openings 164a and 164b. Consequently, the information intended to appear in openings 148, 168, 176 and 158 does not appear elsewhere as a consequence of which the space on the indicia bearing sheet is conserved. Additionally, if the longitudinal dimension of each of the openings is considered as $k$, it will be noted that a longitudinal interval of $k$ units exists between opening 148 and 168 and a longitudinal interval equal to $2k$ units exists between opening 168 and the longitudinal position of openings 154, 172, 180 and 162. Thus, the total space between opening 142a and 154 is $5k$ so that advancement of the indicia bearing roll by an amount different from $5k$ will assure that south's cards will not inadvertently appear in openings 154, etc. In the arrangement shown in FIG. 5, the indicia bearing sheet is advanced $4k$ units to increases the cardinal numeral appearing in opening 144 by 1. In the algebraic expression, heretofore give, $k$ is 4 and $m$ is 1.

Advancement of the indicia bearing sheet and rotation of disc 146 continues until the hand is played out, the user of the device consulting an explanatory scroll strip of the type described hereinabove in respect to FIG. 3.

The openings in disc 146 are arranged so that an advance from one play or bid to the next play or bid is effected by rotating the disc through an angular extent of 18°. Consonant with this, opening 166 has an arcuate extent of 72°, opening 170 has an arcuate extent of 54°, opening 174 has an arcuate extent of 36°, and opening 178 has an arcuate extent of 18°. The arcuate extent of each of openings 150, 152, 156, and 160 is 18°.

Disc 146 is but an example of any suitable means for sequentially revealing the indicia registered with openings 148, 154, 158 and 162, and/or openings 168, 172, 176 and 180. Another suitable means for so revealing the indicia includes translucent material for the indicia bearing sheet that bears the material, opaque indicia printed with ink that has the same color as the translucent material, an individual light source aligned with each opening and behind the translucent sheet, and a switching system that causes illumination of the light sources in an appropriate sequence. The enumerated elements are all known in the art, and therefore, need no further detailed explanation. Moreover, the indicia can be in the form of Braille.

What has been described next above assumes that the bidding is such that either north or south is the declarer. Because such does not happen consistently in an actual bridge game, the present invention is adapted to afford experience and training in playing defensive hands. For this purpose, an indicia bearing roll is provided that at the beginning of a given hand has the bidding sequence arranged as described hereinabove, so that south's hand is made to appear in openings 142a and 142b, and the proper bids appear in openings 148, 154, 158 and 162 as disc 146 is rotated as described above. At the end of the bidding, should it appear that east, for example, is the declarer, there is available for substitution of plate 140 onto housing 12, a defensive opaque plate 184, shown in FIG. 6a. Through an opening 185 appears cardinal number 5 which indicates that the fifth set of indicia is revealed. It will be assumed that the set of indicia visible through the openings in plate 184 is preceded by four sets of indicia that specify the bidding of the hand, and that such bidding indicated that east would be the declarer. Accordingly, an opening 186 is provided for revealing the holdings of the dummy hand, west. A similar sized opening 188 is provided for revealing south's holdings. Openings 186 and 188 each occupy approximately one third of the width of plate 184 and are disposed adjacent opposite transverse sides of the plate, so that between the openings an equivalent amount of space exists. In such space on the indicia bearing sheet are set forth indicia that specify the cards played by the respective hands during the course of play. For revealing these indicia, plate 184 is formed with openings 190, 192, 194, and 196, which correspond respectively with south, west, north and east hands, and which are in quadrature with one another. For revealing the indicia in sequence, as would occur during actual playing of a bridge hand, the indicia bearing sheet can be advanced for each play. An alternate, which significantly conserves space on the indicia bearing sheet includes a disc 198 mounted for rotative movement on plate 184. For so mounting the disc, a snap pin 200 is provided to fit through holes in the disc and in plate 184. Disc 198 includes an opaque tab 202 that has an arcuate extent of approximately 18°, sufficient to close opening 190, and an opaque tab 204, that has an arcuate extent twice that of tab 202. Disc 200 also has a tab 206 that has an arcuate extent equal to three times that of tab 202, and a tab 208 has an arcuate extent equal to four times that of tab 202. It will thus be seen that disc 198 obscures all openings 190 — 196 in the position shown in FIG. 6a, and that rotation of the disc 18° in a clockwise direction will reveal only the indicium in opening 190. Subsequent rotative steps in 18° increments will reveal in sequence the indicia appearing in openings 192, 194 and 196. When such plays have been completed, the user of the device positions disc 198 so that an arrow points to the winner of the trick and then advances the strip so as to bring cardinal number 6 into view through opening 185, and play continues. Openings 210 and 212 are provided for revealing a cumulative trick count for the east-west team and the north-south team, respectively.

Post 200, which is located at the center of disc 198, is readily removable from engagement with the hole in plate 198. This permits plate 184 to be reversed or replaced by another plate that is a mirror image of plate 184 so that opening 186 is on the right side of the device as shown in FIG. 6b. In this fashion the player is permitted to defend against a hand in which west is the declarer, and east is the dummy. Obviously, the indicia on the indicia bearing sheet will be arranged so as to accommodate this condition, and it will be seen that the present invention by provision of a reversible plate 184 permits complete versatility, and faithful adherance to actual bridge-playing situations.

The present invention lends itself well to provision of a highly compact and portable device that combines both the indicia bearing sheet described above and the explanatory scroll that is associated with such sheet. In this respect, attention is invited to FIG. 7 in which a casing 12' has an upper face 212 that defines an opening for receiving therein a plate conforming to any of the embodiments heretofore described.

Figure 7:
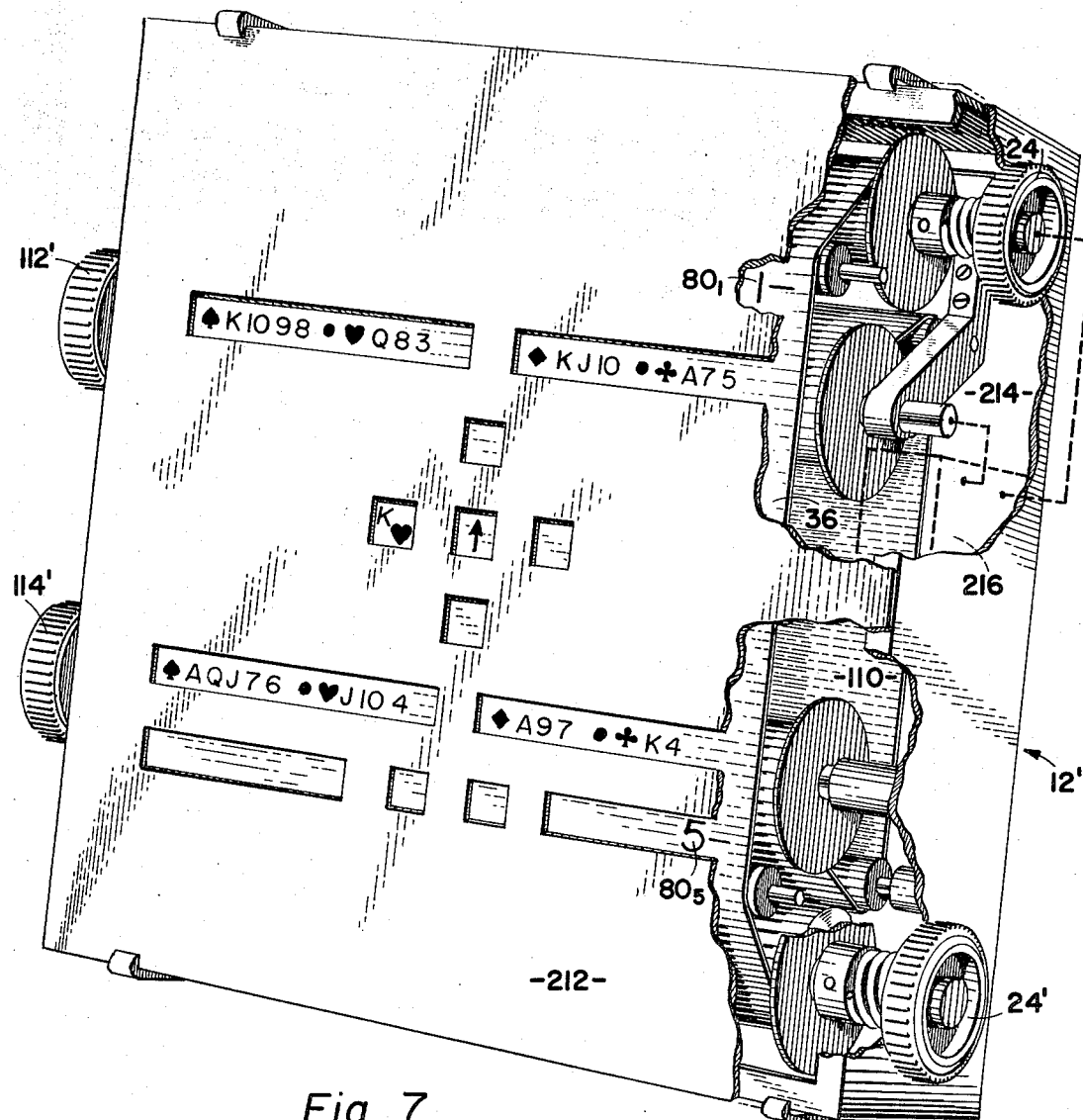
FIG. 7 is a perspective view of still another embodiment of the present invention.

Shown in FIG. 7, by way of example only, is a plate corresponding to that designated above as 46 in FIG. 1, together with an indicia bearing roll 36. Roll advance mechanisms 24 and 24' are provided for advancing roll 36 in accordance with the invention as heretofore described. Housing 12' is also provided with roll advance mechanisms 112' and 114' that support a scroll strip 110. Housing 12' has a bottom wall 214 that is provided with an opening suitable to reveal to the user of the device the contents of the scroll strip. Thus, when the player perceives a play or bid through the openings in upper face 212, he need only reverse casing 12' and appropriately manipulate scroll advance mechanisms 112 and 114 to bring into view the explanatory and educational material relating to the bid or play in question. Thus, the invention provides in a single, compact housing all the information that is necessary to lead the player through a number of bridge hands. Obviously, the pattern of the openings in upper face 212 can be replaced by any of the other plates heretofore described without materially affecting the operation of the invention as described above.

Another advantageous arrangement that the device of FIG. 7 permits is employment of a defensive plate of the type shown in FIGS. 6a and 6b on bottom wall 214. In such arrangement the user manipulates roll advance mechanisms 24 and 24' until a hand occurs in which either east or west is the declarer and then turns over housing 12' to complete the hand by manipulation of roll advance mechanisms 112' and 114'.

In schematic form in FIG. 7 is shown a roll advance correlating mechanism 216 which forms a functional link between advance mechanism 24 associated with indicia bearing sheet 36, and advance mechanism 112' associated with scroll strip 110. The specific details of correlating means 216 do not constitute a part of this invention; suffice it to say, the correlating mechanism can include complementary indicia on sheet 36 and scroll strip 110 or appropriate mechanical, electromechanical, and/or electronic elements as are necessary to achieve the purpose. That is to say, through the use of correlating means 216, scroll strip 110 can be made to follow movements of indicia bearing sheet 46, so that the appropriately correlated explanatory and educational material is always available to the user of the device.

Although several embodiments of the invention have been shown and described, it will be obvious that other adaptations and modifications can be made without departing from the true spirit and scope of the invention.

I claim:

1. Apparatus for simulation of bidding and playing of a four-sided card game that has a south hand, a north hand opposite the south hand, and east and west hands in quadrature with the south hand, said apparatus comprising a planar opaque member having a longitudinal dimension and a transverse dimension perpendicular to the longitudinal dimension, said planar member having first and second openings that have a dimension $k$ in the longitudinal direction sufficient that an indicium of readily legible height can be displayed therein, the first and second openings being aligned longitudinally with one another at the approximate transverse center of said planar member and being longitudinally spaced apart from one another by an amount equal to $k(m(n\pm1))$ units wherein $n$ and $m$ are positive integers, said planar member having third and fourth openings therein that have a dimension in the longitudinal direction equal to said first and second openings, said third and fourth openings corresponding to respective said east and west hands, said third and fourth openings being disposed in approximate transverse center of said planar member and being disposed longitudinal midway between said first and second openings, whereby said openings form a generally diamond-shaped pattern simulating player positions of the card game, said planar member having adjacent said first opening a fifth opening of sufficient area to reveal 13 indicia therethrough, a sixth opening adjacent one of said second, third, and fourth openings having an area sufficient to reveal 13 indicia therethrough, an indicia bearing sheet supported for slidable longitudinal movement behind said planar member, said sheet having the indicia thereon arranged so that sequences of bids and plays are revealed through said openings in response to movement of said sheet with respect to said planar member, and means for moving said sheet longitudinally of said planar member by an amount equal to $kn$ so that no indicium on said sheet will appear in two different openings.

2. The invention of claim 1 wherein said sixth opening is disposed adjacent said second opening, said sixth opening being sufficiently elongate in a transverse direction as to reveal thirteen indicia therein, said sixth opening being spaced from said fifth opening by an amount equal to $k(m(n\pm1))$ units so that indicia appearing in said fifth opening will not appear in said sixth opening.

3. The invention of claim 2 wherein said planar member includes longitudinally aligned opaque regions centrally of said fifth and sixth openings, said opaque regions having the same transverse extent as said first and second openings and being in longitudinal alignment with said first and second openings.

4. The invention of claim 1 wherein said fifth opening is disposed at one transverse side of said planar opaque member and said sixth opening is positioned on the other transverse side of said planar opaque member, said fifth and sixth openings being so proportioned and spaced as to define therebetween a central area, said first, second third, and fourth openings being formed in said central area.

5. The invention of claim 1 wherein said indicia bearing sheet has plurality of sets of four indicia positioned for simultaneous registry with said first, second, third and fourth openings in combination with means for sequentially revealing said indicia through said first, second, third and fourth openings.

6. The invention of claim 5 wherein said sequential revealing means comprises an opaque disc adapted to overlie said first, second, third and fourth openings, said disc having at least one aperture therein for revealing therethrough the indicia residing in registry with said first, second, third and fourth openings, and means for mounting said disc on said planar member for rotation relative thereto so that said aperture can be moved sequentially into alignment with said first, second, third and fourth openings.

7. The The invention of claim 6 wherein said disc-mounting means is removable so that said disc can be mounted on either side of said planar member.

8. The invention of claim 6 wherein said aperture constitutes a first aperture and has a circumferential extent four times that of said first, second, third and fourth openings so that said disc can be rotated through four increments of rotation and reveal therethrough a give indicium on said strip throughout all four increments, said disc having a second aperture spaced 90° from said first aperture, said second aperture having a circumferential extent of three increments, said disc having a third aperture spaced 90° from said second aperture, said third aperture having a circumferential extent of two increments, said disc having a fourth aperture spaced 90° from said third aperture, said fourth aperture having a circumferential extent of one increment, whereby an indicium revealed through said first aperture will remain continuously visible during sequential revelation of indicia through said second, third and fourth apertures in response to rotation of said disc.

9. The invention of claim 1, in combination with an elongate scroll strip having verbal material thereon explanatory of the indicia on said indicia bearing sheet, means for communicating to the user of the apparatus the verbal material on said strip, and means for correlating the position of said scroll strip with respect to said indicia bearing sheet so that the appropriate verbal material on said scroll strip is communicated to the user when the corresponding indicia on said indicia bearing sheet is visible through the openings in said opaque planar member.

10. The invention of claim 9 wherein said communicating means comprises visible alphameric material constituting the indicia on said sheet, an opaque plate having an opening therein for revealing portions of the alphameric material on said scroll strip therethrough, and means for supporting said scroll strip for movement beneath said plate and in alignment with said opening.

11. The invention of said 10 in combination with a casing having front and backwalls, said walls each having an opening therein for receiving respectively said opaque planar member and said opaque plate, and means mounted in said casing for transporting said indicia bearing sheet and said scroll sheet beneath respective said planar member and said plate, said transporting means including control means accessible from the exterior of said casing.

12. An article of manufacture for use with a planar, opaque member that includes at least a first opening having a longitudinal dimension $k$ and a second opening having equivalent longitudinal dimension and being longitudinally spaced from the first opening by a distance $k$ wherein $m$ and $n$ are positive integers, said article of manufacture comprising an elongate strip for movement beneath said opaque member, a first group of indicia on said strip that is composed of a plurality of first sets of indicium for sequential registry with said first opening, said first sets being uniformly longitudinally spaced along said strip so that the sets will be sequentially revealed through said first opening in response to movement of the strip by an amount equal to $kn$, a second group of indicia on said strip that is composed of a plurality of second sets of indicium for sequential registry with said second opening, said second sets being uniformly longitudinally spaced apart along said strip by a distance equal to $kn$ so that movement of the strip in increments of $kn$ sequentially display said second sets through said second opening, said first sets being longitudinally interposed between said second sets and being spaced from said second sets by an amount $k$ such that one of said first sets is displayed in said first opening simultaneous with display of one of said second sets in said second opening, whereby said first sets will not appear in said second opening and said second sets will not appear in said first opening in response to movement of the strip in increments of $kn$.

13. An article of manufacture comprising an elongate strip having a longitudinal dimension and a transverse dimension, a first group of indicia on said strip, said first group being composed of a plurality of first sets of individual indicium, said first sets being uniformly longitudinally spaced apart along said strip and sequentially depicting the contents of a first hand of a card game as play of the game proceeds, a second group of indicia on said strip, said second group being composed of a plurality of second sets of individual indicium, said second sets being uniformly longitudinally spaced apart along said strip and being interposed between respective ones of said first sets, said second sets sequentially depicting the contents of a second hand of a card game as play of the game proceeds, the individual sets in each said groups being spaced from adjacent sets in the same group by a distance of $kn$, the sets of said first group being spaced from the sets of said second group by distance of $k$, wherein $m$ and $n$ are positive integers, so that a first set and a second set will not recur at an interval equal to $kn$.